Figure 1:
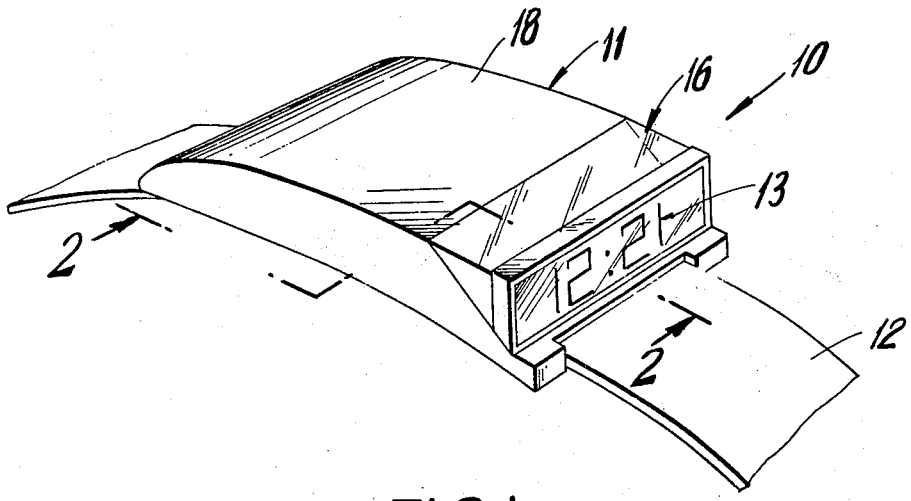
Figure 2:
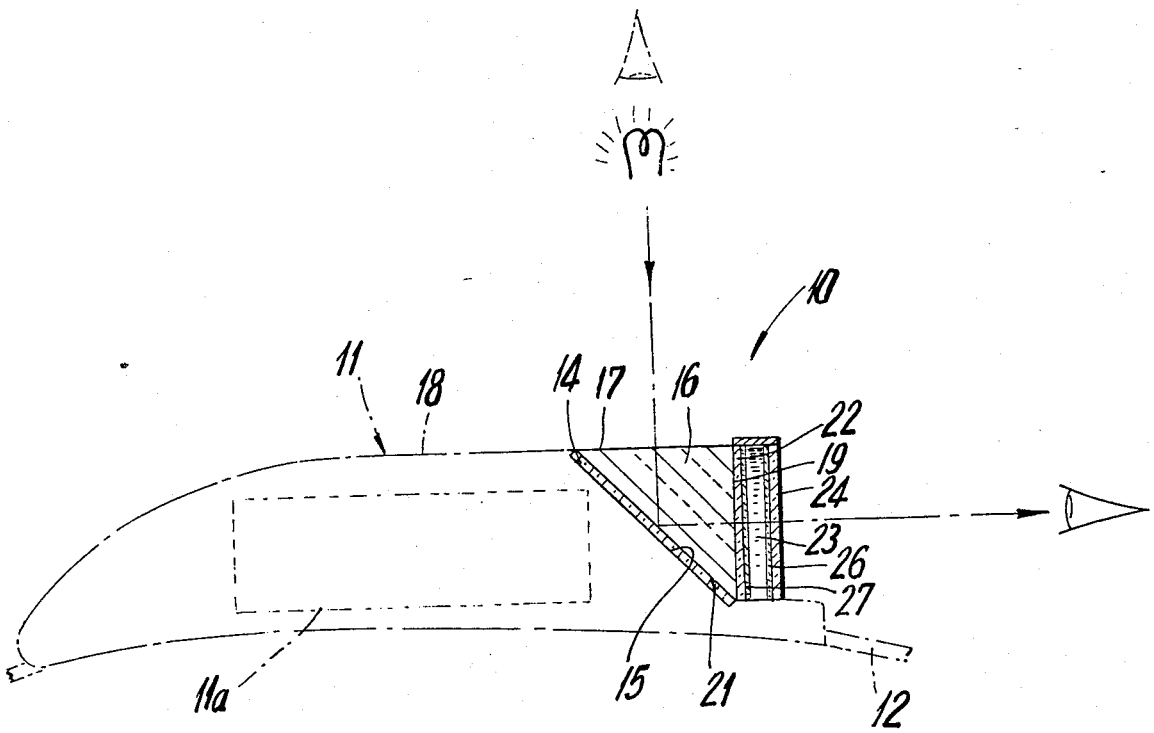

350-345 SR

XR T 936,004

A. E. WILLIS

T936,004

SOLID STATE WATCH DISPLAY

Filed July 1, 1974

2

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 1, 1975

936 O.G. 7

T936,004
SOLID STATE WATCH DISPLAY
Alan E. Willis, 122 Berrian Road,
Stamford, Conn. 06902
Filed July 1, 1974, Ser. No. 484,481
Int. Cl. G04b *19/30*
U.S. Cl. 58—50 R
1 Sheet Drawing. 9 Pages Specification

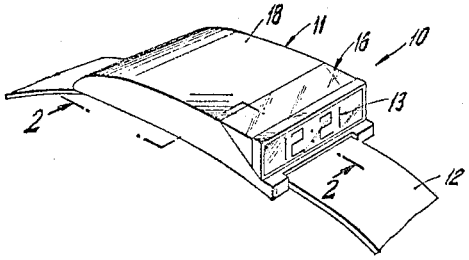

A solid state watch display comprises a display mounted to the sloping face of a solid state watch. The display includes a reflector mounted along the sloping face of the watch, a triangular prism with the hypotenuse of the triangle adjacent to the reflector, a polarizing filter adjacent to the vertical face of the prism and a liquid crystal cell between said polarizing filter and an outer polarizing filter. The light enters the prism through the upper horizontal face thereof, and is reflected outwardly through the vertical face of the prism. The light passes twice through polarizers in contrast to the four passes generally required by conventional front illuminated displays. Thus, there is considerably less loss of light with the subject display.